US011827209B2

United States Patent
(12) Sakashita

(10) Patent No.: US 11,827,209 B2
(45) Date of Patent: Nov. 28, 2023

(54) MOTOR CONTROL DEVICE

(71) Applicant: HINO MOTORS, LTD., Hino (JP)

(72) Inventor: Hiroki Sakashita, Hino (JP)

(73) Assignee: HINO MOTORS, LTD., Hino (JP)

( * ) Notice: Subject to any disclaimer, the term of this patent is extended or adjusted under 35 U.S.C. 154(b) by 806 days.

(21) Appl. No.: 16/962,008

(22) PCT Filed: Jul. 10, 2019

(86) PCT No.: PCT/JP2019/027417
§ 371 (c)(1),
(2) Date: Jul. 14, 2020

(87) PCT Pub. No.: WO2020/013251
PCT Pub. Date: Jan. 16, 2020

(65) Prior Publication Data

US 2021/0053554 A1 Feb. 25, 2021

(30) Foreign Application Priority Data

Jul. 13, 2018 (JP) ................................ 2018-133014

(51) Int. Cl.
*B60W 20/15* (2016.01)
*B60W 10/08* (2006.01)
(Continued)

(52) U.S. Cl.
CPC ............ *B60W 20/15* (2016.01); *B60W 10/08* (2013.01); *B60W 50/045* (2013.01); (Continued)

(58) Field of Classification Search
CPC ................ B60W 10/08; B60W 20/00; B60W 2510/246; B60L 2240/423
See application file for complete search history.

(56) References Cited

U.S. PATENT DOCUMENTS 10,696,290 B2 * 6/2020 Chikkannanavar .... B60W 20/11
2007/0216312 A1 * 9/2007 Ogata ..................... B60K 6/48 315/131

(Continued)

FOREIGN PATENT DOCUMENTS

JP H09-191582 A 7/1997
JP 2009-090735 A 4/2009

(Continued)

OTHER PUBLICATIONS 1) 2015-033154, A, Japan, Abstract.

(Continued)

*Primary Examiner* — Ryan Rink
(74) *Attorney, Agent, or Firm* — KILPATRICK TOWNSEND & STOCKTON LLP

(57) ABSTRACT

A motor control device includes an acquisition unit and a torque control unit that controls, by selectively using one of a first map and a second map, a motor torque defined in correspondence with a requested torque and an engine rotation speed in each of the first map and the second map. The torque control unit controls the motor torque using the first map when the battery temperature is less than a switch temperature lower than a limit start temperature at which the motor torque is limited, and controls the motor torque using the second map when the battery temperature is greater than or equal to the switch temperature and less than the limit start temperature. The second map includes a larger assist region than the first map. The assist region of the second map defines a smaller maximum torque than the assist region of the first map.

4 Claims, 6 Drawing Sheets

(51) Int. Cl.
*B60W 50/04* (2006.01)
*H01M 10/48* (2006.01)
*B60W 50/00* (2006.01)

(52) U.S. Cl.
CPC .... *H01M 10/48* (2013.01); *B60W 2050/0088* (2013.01); *B60W 2510/0638* (2013.01); *B60W 2510/244* (2013.01); *B60W 2510/246* (2013.01); *B60W 2520/10* (2013.01)

(56) References Cited

U.S. PATENT DOCUMENTS

2007/0233334 A1* 10/2007 Kozarekar ............ B60W 20/13 701/22
2009/0258280 A1* 10/2009 Ishikura .................. B60L 58/12 429/50
2010/0156352 A1* 6/2010 Muta ....................... B60L 50/16 180/65.21
2014/0180441 A1* 6/2014 Hiasa .................... B60W 10/06 700/22
2015/0224980 A1* 8/2015 Tabata .................. B60W 20/30 180/65.265
2016/0144739 A1* 5/2016 Ando ....................... B60K 1/02 701/22
2017/0008509 A1* 1/2017 Sato ......................... B60K 6/48
2017/0066433 A1* 3/2017 Muta ..................... B60W 20/14
2017/0066434 A1* 3/2017 Kato ..................... B60W 10/26
2018/0361844 A1* 12/2018 Kinzuka ............. F02D 41/0007
2021/0164528 A1* 6/2021 Lee ....................... B60W 10/02
2022/0242250 A1* 8/2022 Bolger .................... B60L 50/60

FOREIGN PATENT DOCUMENTS

JP 2015-033154 A 2/2015
JP 2017-100473 A 6/2018
WO 2017-104033 A1 6/2017

OTHER PUBLICATIONS

International Search Report and Written Opinion dated Oct. 8, 2019 in International Patent Application No. PCT/JP2019/027417, filed Jul. 10, 2019, 9 pages.

* cited by examiner

Fig.9A
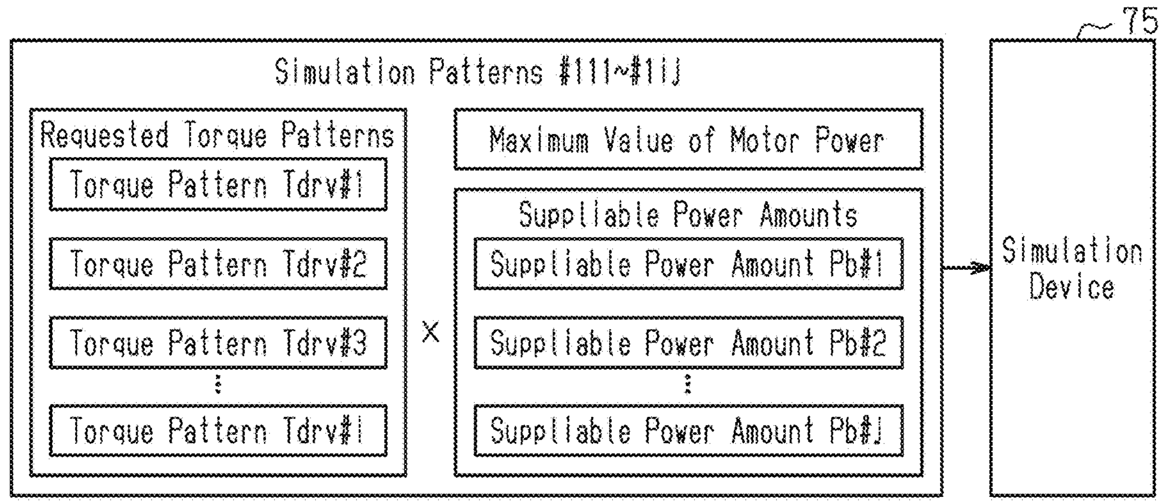
Fig.9B
| Simulation Pattern | Motor Power | Requested Torque Pattern | Supplliable Power Amount | | Optimization Map |
|---|---|---|---|---|---|
| #111 | Pm1 | Tdrv#1 | Pb#1 | ↔ | M#111 |
| #112 | Pm1 | Tdrv#1 | Pb#2 | ↔ | M#112 |
| ⋮ | ⋮ | ⋮ | ⋮ | | ⋮ |
| #11j | Pm1 | Tdrv#1 | Pb#j | ↔ | M#11j |
| #121 | Pm1 | Tdrv#2 | Pb#1 | ↔ | M#121 |
| ⋮ | ⋮ | ⋮ | ⋮ | | ⋮ |
| #1ij | Pm1 | Tdrv#i | Pb#j | ↔ | M#1ij |
Fig.9C
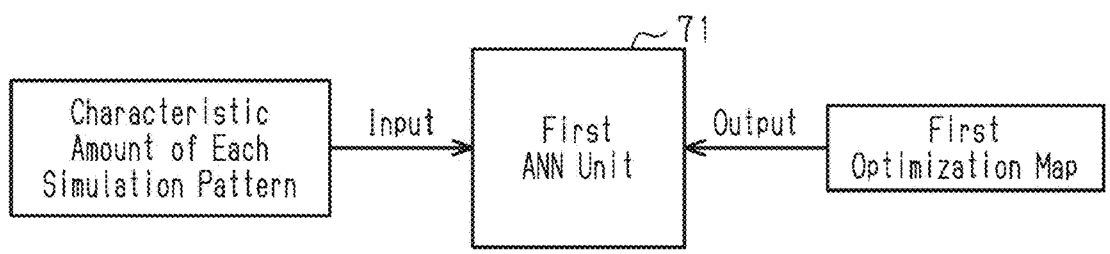

MOTOR CONTROL DEVICE

TECHNICAL FIELD

The present disclosure relates to a motor control device that controls a motor installed in a hybrid automobile.

BACKGROUND ART

A known hybrid automobile includes an engine and a motor, which are drive sources. In the hybrid automobile, fuel economy can be improved by driving the motor and assisting the engine when the engine combustion efficiency is low (for example, when the automobile is started). In the battery that supplies such a motor with power, thermal degradation tends to progress easily as the battery temperature (the temperature of the battery) becomes excessively high. Thus, Patent Document 1 discloses an example of a technique of curbing an excessive rise in the battery temperature by limiting the power supplied to the motor, i.e., by limiting the output of the motor, when the battery temperature is greater than or equal to a predetermined limit temperature.

PRIOR ART DOCUMENTS

Patent Documents

Patent Document 1: Japanese Laid-Open Patent Publication No. 2015-33154

SUMMARY OF THE INVENTION

Problems that the Invention is to Solve

The technique described in Patent Document 1 is capable of curbing an excessive rise in the battery temperature. However, there is still room for improvement in the reduction of fuel economy in a situation where the battery temperature easily reaches a discharge limit temperature, for example, on a long uphill road.

It is an objective of the present disclosure to provide a motor control device capable of improving fuel economy while curbing an excessive rise in the battery temperature.

Means for Solving the Problem

An aspect of the present disclosure provides a motor control device configured to control a motor. The motor is configured to be supplied with power from a battery and assist an engine. The motor control device includes an acquisition unit configured to acquire a battery temperature, a requested torque, and an engine rotation speed, the battery temperature being a temperature of the battery, the requested torque being torque requested from a driver, the engine rotation speed being a rotation speed of the engine, and a torque control unit configured to control a motor torque by selectively using one of a first map and a second map, the motor torque being output by the motor, the motor torque being defined in correspondence with the requested torque and the engine rotation speed in each of the first map and the second map. The torque control unit is configured to control the motor torque using the first map when the battery temperature is less than a switch temperature, the switch temperature being lower than a limit start temperature at which the motor torque is limited, and control the motor torque using the second map when the battery temperature is greater than or equal to the switch temperature and less than the limit start temperature. Each of the first map and the second map includes an assist region defined using the requested torque and the engine rotation speed, the assist region of the second map being larger than the assist region of the first map. A maximum torque defined in the assist region of the second map being smaller than a maximum torque defined in the assist region of the first map.

BRIEF DESCRIPTION OF THE DRAWINGS

FIG. 9A is a diagram schematically showing the overview of preliminary simulations.

FIG. 9B is a diagram showing an example of the relationship between the simulation patterns and optimization maps.

FIG. 9C is a diagram schematically showing an example of a learning mode executed by the first neural network unit.

MODES FOR CARRYING OUT THE INVENTION

A motor control device according to an embodiment will now be described with reference to the drawings.

Figure 1:
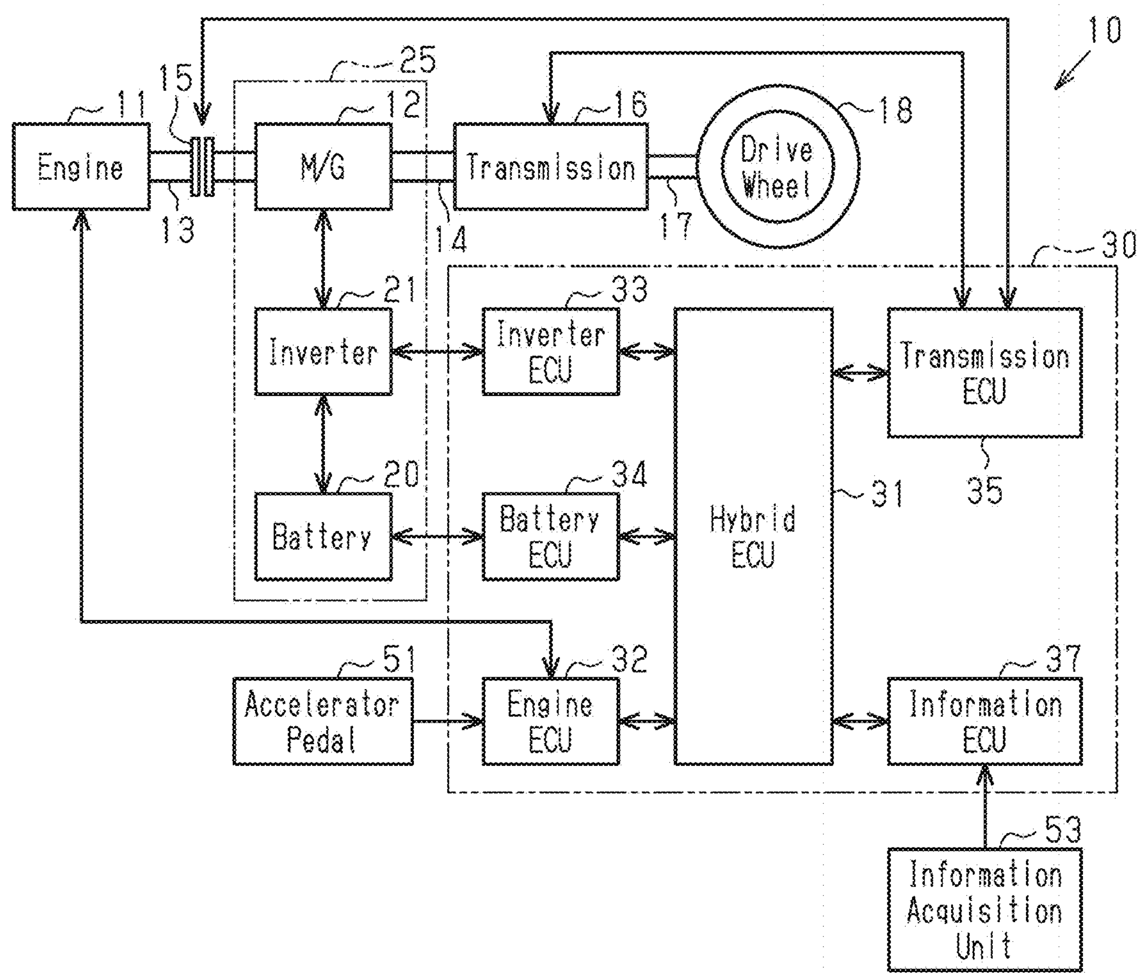
FIG. 1 is a functional block diagram schematically showing the overall configuration of a hybrid automobile equipped with a motor control device according to an embodiment.

As shown in FIG. 1, a vehicle 10, which is a hybrid automobile, includes an engine 11 and a motor generator 12 (hereinafter referred to as M/G 12), which are power sources. A rotary shaft 13 of the engine 11 and a rotary shaft 14 of the M/G 12 are connected to each other such that they can be disconnected by a clutch 15. The rotary shaft 14 of the M/G 12 is connected to drive wheels 18 via, for example, a transmission 16 and a drive shaft 17.

The engine 11 is, for example, a diesel engine with multiple cylinders. When fuel burns in each cylinder, torque is generated to rotate the rotary shaft 13. When the clutch 15 is connected, the torque generated by the engine 11 is transmitted to the drive wheels 18 via the rotary shaft 14 of the M/G12, the transmission 16, and the drive shaft 17.

The M/G 12 is electrically connected to a battery 20 via an inverter 21. The battery 20 is a rechargeable battery capable of being charged and discharged. The battery 20 includes multiple cells that are electrically connected to one another. When supplied with the power stored in the battery 20 via the inverter 21, the M/G 12 functions as a motor that assists the engine 11 by rotating the rotary shaft 14. When the M/G 12 functions as a motor, the M/G 12 generates a motor torque Tm. The motor torque Tm is transmitted to the drive wheels 18 through the transmission 16 and the drive shaft 17. Further, the M/G 12 functions as a generator that stores, in the battery 20 via the inverter 21, the power generated using the rotation of the rotary shaft 14 when, for example, the accelerator is off. When the M/G 12 functions as a generator, the M/G 12 generates a braking torque, which is referred to as a regenerative torque Tr. The regenerative torque Tr is controllable in a range less than or equal to a maximum regenerative torque Trmax, which is set for each motor rotation speed Nm.

The transmission 16 changes the torque of the rotary shaft 14 of the M/G 12 and transmits the torque to the drive wheels 18 through the drive shaft 17. The transmission 16 is capable of setting multiple gear ratios Rt.

When the M/G 12 functions as a motor, the inverter 21 converts the direct-current voltage from the battery 20 into alternating-current voltage to supply the M/G 12 with power. When the M/G 12 functions as a generator, the inverter 21 converts the alternating-current voltage from the M/G 12 into direct-current voltage to supply the battery 20 with power and charge the battery 20.

The vehicle 10 includes a high-voltage circuit 25 having the M/G 12, the inverter 21, the battery 20, which are high-voltage components. In the following description, the current flowing into the battery 20 when power is supplied from the inverter 21 to the M/G 12 is referred to as the discharge current, and the current flowing into the battery 20 when power is supplied from the inverter 21 to the battery 20 is referred to as the charge current.

Figure 2:
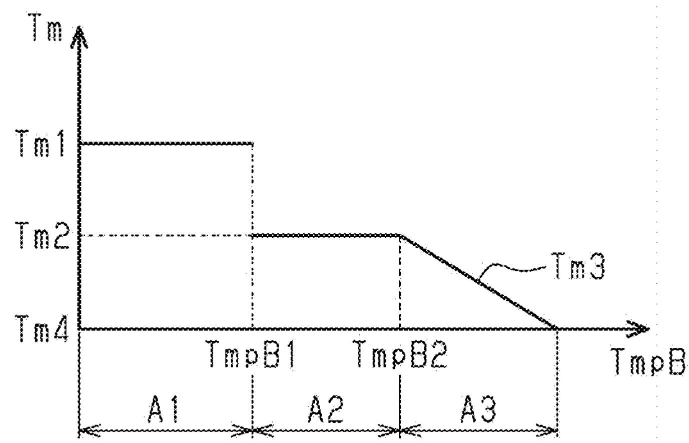
FIG. 2 is a graph schematically showing an example of a maximum value of a motor torque for each battery temperature.

As shown in FIG. 2, in the battery 20, the range of a battery temperature TmpB, which is the temperature of the battery 20, is divided into three regions with different maximum values of the motor torque Tm. In a first region A1, the battery temperature TmpB is less than a switch temperature TmpB1, and a first maximum torque Tm1 is defined as the maximum value of the motor torque Tm. In a second region A2, the battery temperature TmpB is greater than or equal to the switch temperature TmpB1 and less than a limit start temperature TmpB2, and a second maximum torque Tm2, which is smaller than the first maximum torque Tm1, is defined as the maximum value of the motor torque Tm. In a limit region A3, the battery temperature TmpB is greater than or equal to the limit start temperature TmpB2. The temperature greater than or equal to the limit start temperature TmpB2 may be referred to as the limit temperature. In the limit region A3, a limit torque Tm3 is defined. The limit torque Tm3 becomes smaller than the second maximum torque Tm2 as the battery temperature TmpB becomes higher than the limit start temperature TmpB2. The minimum value of the limit torque Tm3 is a minimum limit torque Tm4.

The above-described engine 11, clutch 15, inverter 21, transmission 16, and the like are controlled by a control device 30. The control device 30 controls the vehicle 10 in an integrated manner.

The control device 30 includes, for example, a hybrid ECU 31, an engine ECU 32, an inverter ECU 33, a battery ECU 34, a transmission ECU 35, and an information ECU 37. The ECUs 31, 32, 33, 34, 35, and 37 are connected to one another by, for example, a control area network (CAN).

The electronic control units (ECUs) 31, 32, 33, 34, 35, and 37 mainly include a microcomputer in which a processor, a memory, an input interface, an output interface, and the like are connected to one another by a bus. The ECUs 31, 32, 33, 34, 35, and 37 acquire state information, which relates to the state of the vehicle 10, via the input interface and executes various processes using the acquired state information and using a control program and various types of data stored in the memory.

The hybrid ECU 31 acquires, through the input interface, various types of the state information output by the ECUs 32, 33, 34, 35, and 37. For example, the hybrid ECU 31 uses a signal from the engine ECU 32 to acquire a requested torque Tdrv, which is requested from the driver, and acquires an engine rotation speed Ne, which is the rotation speed of the rotary shaft 13 of the engine 11. That is, the hybrid ECU 31 corresponds to a requested torque acquisition unit and a rotation speed acquisition unit. The hybrid ECU 31 uses a signal from the inverter ECU 33 to acquire the motor rotation speed Nm, which is the rotation speed of the rotary shaft 14 of the M/G 12, and also acquire a motor temperature TmpM, which is the temperature of the M/G 12, and an inverter temperature Tmp1, which is the temperature of the inverter 21. That is, the hybrid ECU 31 corresponds to a temperature acquisition unit. The hybrid ECU 31 uses a signal from the battery ECU 34 to acquire a battery voltage and also acquire a state of charge SOC of the battery 20 and the battery temperature TmpB, which is the temperature of the battery 20. That is, the hybrid ECU 31 corresponds to a state-of-charge acquisition unit and the temperature acquisition unit. The hybrid ECU 31 uses a signal from the transmission ECU 35 to acquire, for example, a disconnection state of the clutch 15 and a gear ratio Rt in the transmission 16. The hybrid ECU 31 uses a signal from the information ECU 37 to acquire a vehicle speed v. That is, the hybrid ECU 31 corresponds to a vehicle speed acquisition unit.

The hybrid ECU 31 uses the acquired information to generate various control signals and output the generated control signals to the ECUs 32, 33, 34, 35, and 37 via the output interface. The hybrid ECU 31 calculates an engine command torque Teref, which is a command torque to the engine 11, and outputs to the engine ECU 32 a control signal indicating the calculated engine command torque Teref. The hybrid ECU 31 calculates a motor command torque Tmref, which is a command torque to the M/G 12, and outputs to the inverter ECU 33 a control signal indicating the calculated motor command torque Tmref. The hybrid ECU 31 outputs to the transmission ECU 35 a control signal commanding the disconnection of the clutch 15 and a control signal commanding the gear ratio Rt in the transmission 16.

The engine ECU 32 acquires the engine rotation speed Ne and an accelerator operation amount ACC of an accelerator pedal 51, and controls, for example, a fuel injection amount and an injection timing such that the torque corresponding to an amount of the engine command torque Teref that has been input from the hybrid ECU 31 acts on the rotary shaft 13. The engine ECU 32 uses, for example, the accelerator operation amount ACC and the engine rotation speed Ne to calculate the requested torque Tdrv and output the calculated requested torque Tdrv to the hybrid ECU 31.

The inverter ECU 33 acquires the motor rotation speed Nm, the motor temperature TmpM, and the inverter temperature Tmp1, and controls the inverter 21 such that the torque corresponding to an amount of the motor command torque Tmref that has been input from the hybrid ECU 31 acts on the rotary shaft 14. The inverter ECU 33 acquires detection values of motor temperature sensors attached to the M/G 12. The highest temperature in the acquired detection values is the motor temperature TmpM. The inverter ECU 33 acquires detection values of inverter temperature sensors attached to the inverter 21. The highest temperature in the acquired detection values is the inverter temperature Tmp1. The inverter ECU 33 outputs the inverter temperature Tmp1 to the hybrid ECU 31.

The battery ECU 34 monitors a charge/discharge current of the battery 20 and calculates the state of charge SOC of the battery 20 using an integration value of the charge/discharge current. In addition to the charge/discharge current I of the battery 20, the battery ECU 34 acquires the battery voltage and the battery temperature TmpB. The battery ECU 34 acquires detection values of battery temperature sensors attached to the battery 20 and outputs the highest temperature in the acquired detection values to the hybrid ECU 31 as the battery temperature TmpB.

The transmission ECU 35 controls the disconnection of the clutch 15 in response to a request of disconnecting the clutch 15 from the hybrid ECU 31. Further, the transmission ECU 35 controls the gear ratio Rt of the transmission 16 using a control signal that indicates the gear ratio Rt from the hybrid ECU 31.

The information ECU 37 acquires various types of information using signals from various sensors, which are the components of an information acquisition unit 53, and outputs the acquired information to the hybrid ECU 31. For example, the information ECU 37 acquires the vehicle speed v of the vehicle 10 that is based on a signal from a vehicle speed sensor and outputs the acquired vehicle speed v to the hybrid ECU 31.

The overview of the control mode of the motor torque Tm using the hybrid ECU 31 will now be described with reference to FIGS. 3 and 4. First, the basic concept of the control of the motor torque Tm executed by the hybrid ECU 31 will be described with reference to FIG. 3.

Figure 3:
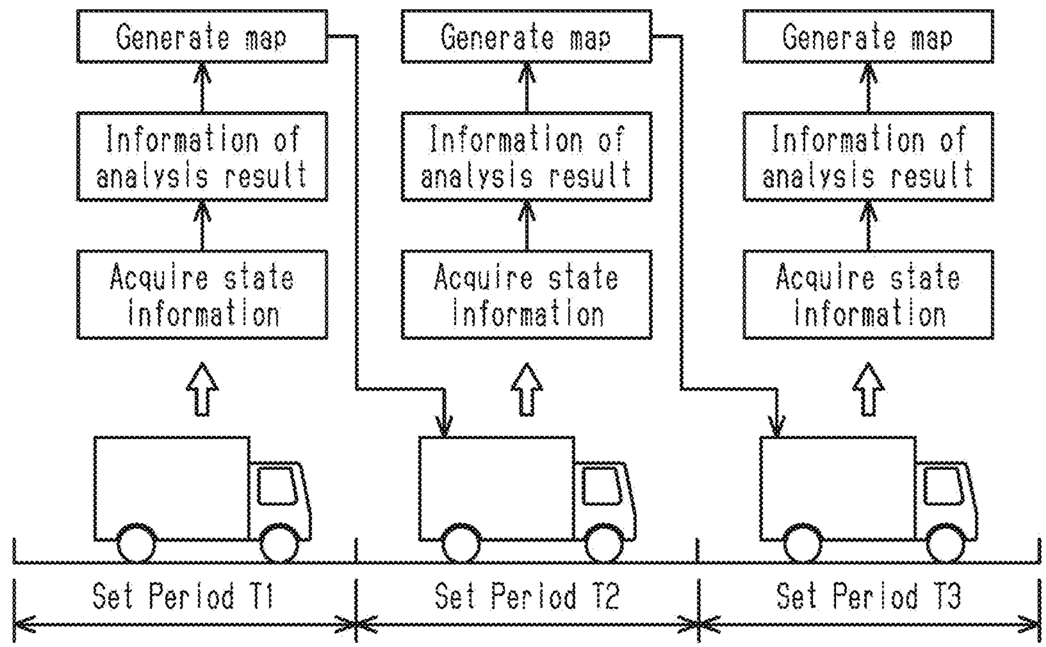
FIG. 3 is a diagram illustrating a map used in each set period.

As shown in FIG. 3, the hybrid ECU 31 analyzes state information acquired in a set period T1 and uses the analysis result to generate a map used to control the motor torque Tm in a set period T2. Further, the hybrid ECU 31 analyzes state information acquired in the set period T2 and uses the analysis result to generate a map used to control the motor torque Tm in a set period T3. In such a manner, when k is an integer greater than or equal to 1, the hybrid ECU 31 generates a map using the analysis result of state information acquired in a set period Tk and controls the motor torque Tm in a set period T(k+1) using the generated map.

The set period Tk may be set in correspondence with the usage situation of a vehicle and the environment of a road. For example, the set period Tk for a vehicle mainly traveling on a highway, such as a large-sized truck used for long-distance transport, may be approximately several minutes because variations in the road environment are small. Further, for example, the set period Tk for a vehicle mainly traveling in a city area, such as a small-sized truck, may be approximately several ten seconds because variations in the road environment are large. In addition, the set period Tk may be defined in advance or changed using an actual travel state. For example, the set period Tk may be changed to be short when variations in the road environment are large and changes in the accelerator operation amount are large, and may be changed to be long when variations in the road environment are small and changes in the accelerator operation amount are small.

Figure 4:
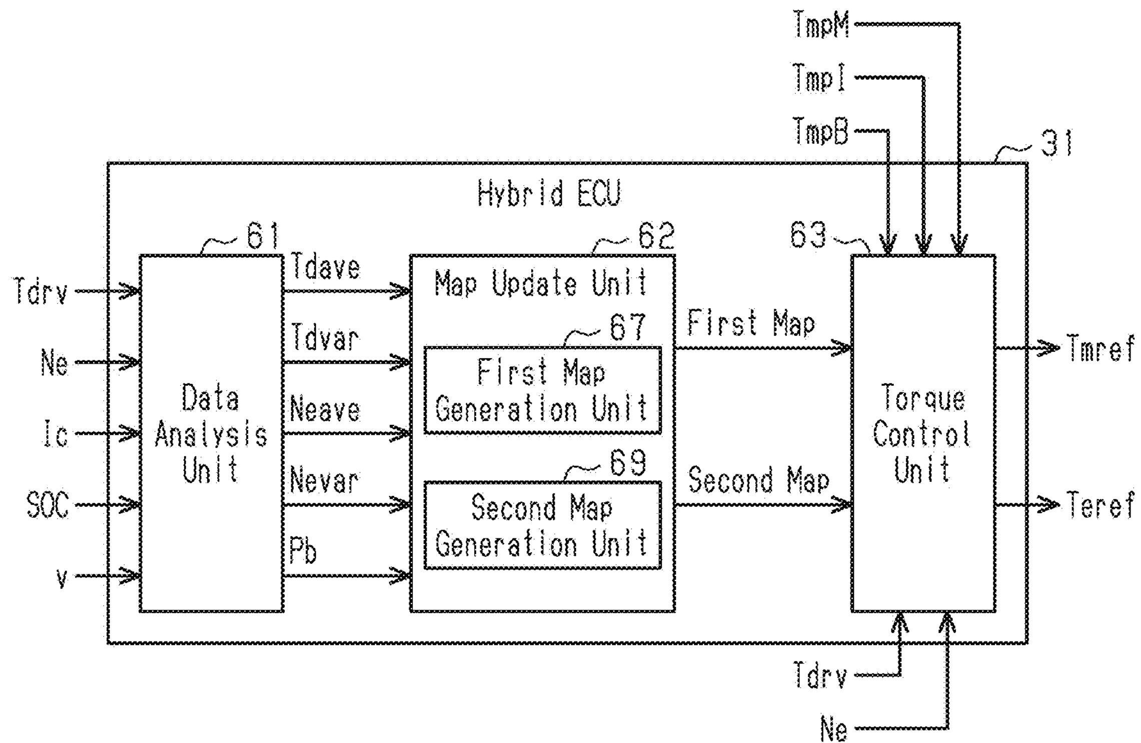
FIG. 4 is a functional block diagram showing an example of the configuration related to control of the motor torque in the hybrid ECU.

As shown in FIG. 4, in regard to the control of the motor torque Tm, the hybrid ECU 31 includes various functional units that function when programs are executed. That is, the hybrid ECU 31 includes a data analysis unit 61, a map update unit 62, and a torque control unit 63.

The data analysis unit 61 calculates multiple characteristic amounts in the set period Tk using the state information of an analysis subject acquired at multiple times in the set period Tk and outputs, to the map update unit 62, the information of the analysis result including the calculated characteristic amounts.

The data analysis unit 61 acquires the state information of an analysis subject including the requested torque Tdrv, the engine rotation speed Ne, a charge current Ic, the state of charge SOC, and the vehicle speed v. Using the the requested torque Tdrv, the engine rotation speed Ne, and the vehicle speed v that have been acquired at multiple times in the set period Tk, the data analysis unit 61 calculates a requested torque average value Tdave and a requested torque dispersion value Tdvar, which are characteristic amounts. Using the engine rotation speed Ne, the requested torque Tdrv, and the vehicle speed v that have been acquired at multiple times in the set period Tk, the data analysis unit 61 calculates an engine rotation speed average value Neave and an engine rotation speed dispersion value Nevar, which are characteristic amounts. Using the charge current Ic and the state of charge SOC that have been acquired at multiple times in the set period Tk, the data analysis unit 61 calculates a suppliable power amount Pb, which is a characteristic amount and the amount of power capable of being supplied to the battery 20 in the set period T(k+1). The data analysis unit 61 outputs, to the map update unit 62, the information of the analysis result including the requested torque average value Tdave, the requested torque dispersion value Tdvar, the engine rotation speed average value Neave, the engine rotation speed dispersion value Nevar, and the suppliable power amount Pb.

The map update unit 62 uses the information of the analysis result of the data analysis unit 61 to generate a map in which the motor torque Tm is defined in correspondence with the requested torque Tdrv and the engine rotation speed Ne.

The map update unit 62 includes a first map generation unit 67. The first map generation unit 67 generates a first map M1 (refer to FIG. 6), which is used when the battery temperature TmpB is in the first region A1. The map update unit 62 also includes a second map generation unit 69. The second map generation unit 69 generates a second map M2 (refer to FIG. 7), which is used when the battery temperature TmpB is in the second region A2. The first map generation unit 67 and the second map generation unit 69 will be described in detail later. The map update unit 62 outputs, to the torque control unit 63, the first map M1 generated by the first map generation unit 67 and the second map M2 generated by the second map generation unit 69. The map update unit 62 updates the first map M1 and the second map M2 by outputting the first map M1 and the second map M2 to the torque control unit 63 in each set period Tk.

The torque control unit 63 controls the motor torque Tm using the requested torque Tdrv, the battery temperature TmpB, and the first and second maps M1 and M2 generated by the map update unit 62 for each set period Tk, and the like.

The control mode of the motor torque Tm using the torque control unit 63 will now be described with reference to FIGS. 5 to 7. The torque control unit 63 repeatedly executes a mode selection process that selects a control mode for controlling the motor torque Tm. The torque control unit 63 calculates the motor torque Tm using the requested torque Tdrv, the engine rotation speed Ne, and the control mode selected in the mode selection process.

Figure 5:
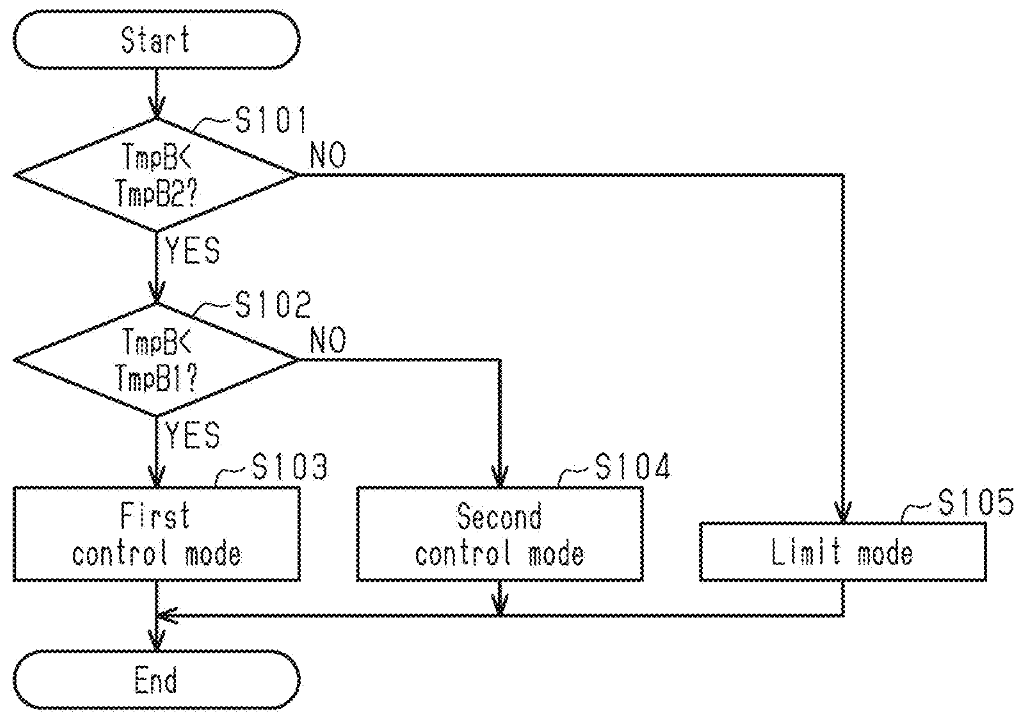
FIG. 5 is a flowchart showing an example of the procedure of a control mode selection process.

As shown in FIG. 5, the control mode selection process uses the torque control unit 63 to acquire the battery temperature TmpB and determine whether the acquired battery temperature TmpB is less than the limit start temperature TmpB2 (step S101). When the battery temperature TmpB is less than the limit start temperature TmpB2 (step S101: YES), the torque control unit 63 determines whether the battery temperature TmpB is less than the switch temperature TmpB1 (step S102).

When the battery temperature TmpB is less than the switch temperature TmpB1 (step S102: YES), that is, when the battery temperature TmpB belongs to the first region A1 (refer to FIG. 2), the torque control unit 63 selects a first control mode for controlling the motor torque Tm using the first map M1 (step S103) and temporarily ends a series of processes. The first control mode is a fuel economy priority mode for controlling the motor torque Tm by assigning top priority to improving fuel economy regardless of the battery temperature TmpB.

When the battery temperature TmpB is greater than or equal to the switch temperature TmpB1 (step S102: NO), that is, when the battery temperature TmpB belongs to the second region A2 (refer to FIG. 2), the torque control unit 63 selects a second control mode for controlling the motor torque Tm using the second map M2 (step S104) and temporarily ends the series of processes. The second control mode is a balance mode for controlling the motor torque Tm so as to improve fuel economy while curbing a rise in the battery temperature TmpB. Thus, when the battery temperature TmpB is less than the limit start temperature TmpB2 (step S101: YES), the torque control unit 63 is configured to switch the map used to control the motor torque Tm between the first map M1 and the second map M2 with reference to the switch temperature TmpB1.

When the battery temperature TmpB is greater than or equal to the limit start temperature TmpB2 (step S101: NO), that is, when the battery temperature TmpB belongs to the limit region A3 (refer to FIG. 2), the hybrid ECU 31 selects the limit mode (step S105) to temporarily end the series of processes. The limit mode is a temperature priority mode for controlling the motor torque Tm by assigning top priority to curbing a rise in the battery temperature TmpB.

Figure 6:
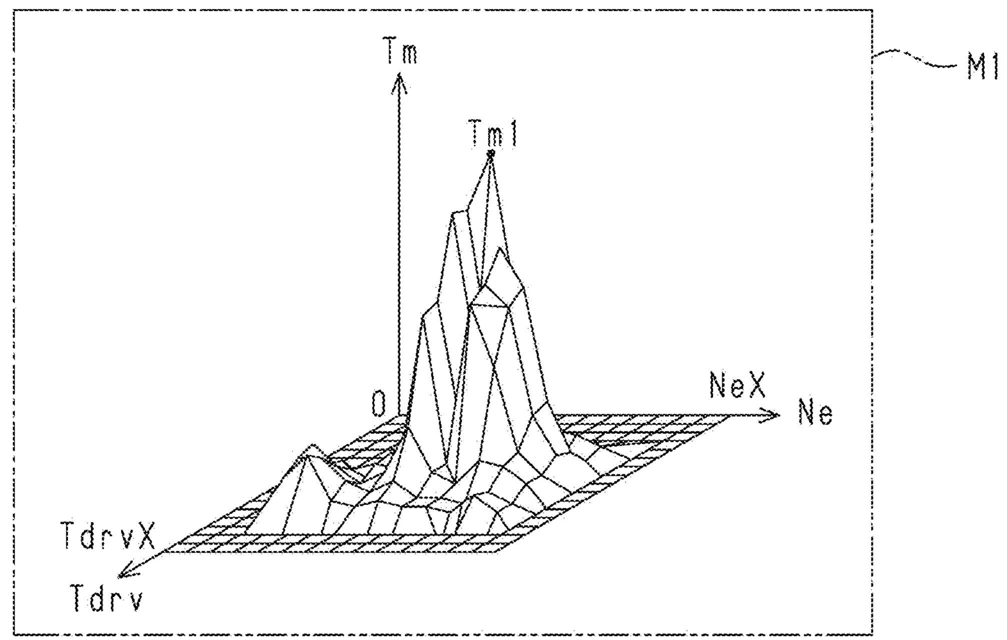
FIG. 6 is a diagram schematically showing an example of a first map.

As shown in FIG. 6, in the first map M1 corresponding to the first control mode, a motor torque Tm less than or equal to the first maximum torque Tm1 is defined for each of the positions that correspond to a requested torque Tdrv less than or equal to a maximum requested torque TdrvX and an engine rotation speed Ne less than or equal to a maximum engine rotation speed NeX. The first map M1 includes an assist region where a motor torque Tm larger than 0 is defined. In the first map M1, 0 is defined as the motor torque Tm in regions other than the assist region (a region with a low engine rotation speed Ne, a region with a high engine rotation speed Ne, a region with a low requested torque Tdrv, and a region with a high requested torque Tdrv). Further, the engine 11 may be assisted using a high motor torque Tm when the combustion efficiency of the engine 11 is low, especially when the engine 11 is accelerating. Thus, the fuel economy may be improved by assisting the engine 11 with the M/G 12. In order to improve the fuel economy, a relatively large motor torque Tm (for example, a motor torque Tm that is larger than the average value of the motor torque Tm in the assist region) is defined in an acceleration region where the engine 11 is accelerating in the assist region of the first map M1. The average value of the motor torque Tm is obtained by averaging a motor torque Tm larger than 0. That is, the first map M1 has a small assist region and a low frequency of assisting with the M/G 12. The torque control unit 63 controls the motor torque Tm to the torque selected from the first map M1 in correspondence with the requested torque Tdrv and the engine rotation speed Ne.

Figure 7:
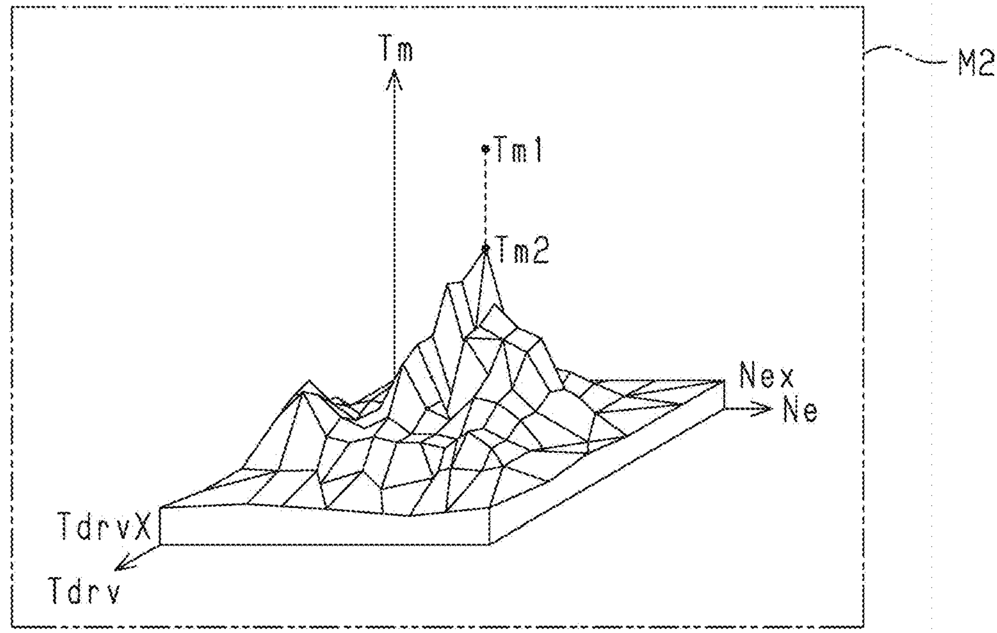
FIG. 7 is a diagram schematically showing an example of a second map.

As shown in FIG. 7, in the second map M2 corresponding to the second control mode, a motor torque Tm less than or equal to the second maximum torque Tm2, which is smaller than the first maximum torque Tm1, is defined for each of the positions that correspond to a requested torque Tdrv less than or equal to the maximum requested torque TdrvX and an engine rotation speed Ne less than or equal to the maximum engine rotation speed NeX. The second map M2 has a larger assist region and a higher frequency of assisting with the M/G 12 than the first map M1. The average value and the dispersion value of the motor torque Tm defined in the acceleration region in the second map M2 are smaller than the average value and the dispersion value of the motor torque Tm defined in the acceleration region in the first map M1. Thus, the second map M2 has a smaller maximum value of the motor torque Tm and a higher assist frequency than the first map M1. The torque control unit 63 controls the motor torque Tm to the torque selected from the second map M2 in correspondence with the requested torque Tdrv and the engine rotation speed Ne.

In the limit mode, the torque control unit 63 controls the motor torque Tm such that the maximum value of the motor torque Tm becomes the limit torque Tm3 corresponding to the battery temperature TmpB. When the battery temperature TmpB is higher than the limit start temperature TmpB2, the limit torque Tm3 becomes smaller than the second maximum torque Tm2 toward the minimum limit torque Tm4 as the battery temperature TmpB becomes higher. When the requested torque Tdrv is larger than the limit torque Tm3, the torque control unit 63 limits the motor torque Tm to the limit torque Tm3. When the requested torque Tdrv is less than or equal to the limit torque Tm3, the torque control unit 63 limits the motor torque Tm to the requested torque Tdrv.

In each control mode, the torque control unit 63 sets, as the motor command torque Tmref, the motor torque Tm obtained using the battery temperature TmpB and outputs the motor command torque Tmref to the inverter ECU 33. Further, the torque control unit 63 sets, as the engine command torque Teref, the torque obtained by subtracting the motor torque Tm from the requested torque Tdrv and outputs the engine command torque Teref to the engine ECU 32.

The first map generation unit 67 and the second map generation unit 69 will now be described with reference to FIGS. 8 to 10.

Figure 8A:
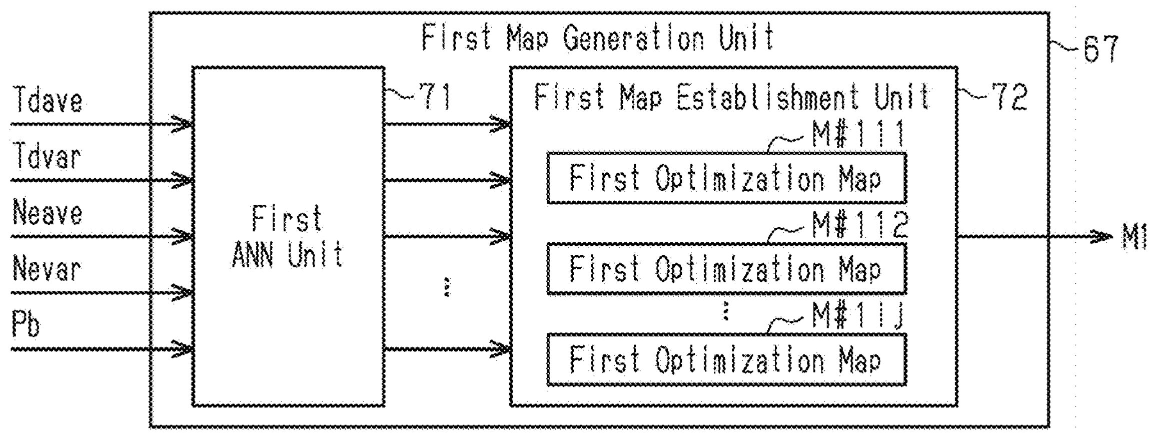
FIG. 8A is a functional block diagram showing an example of the first map generation unit.
Figure 8B:
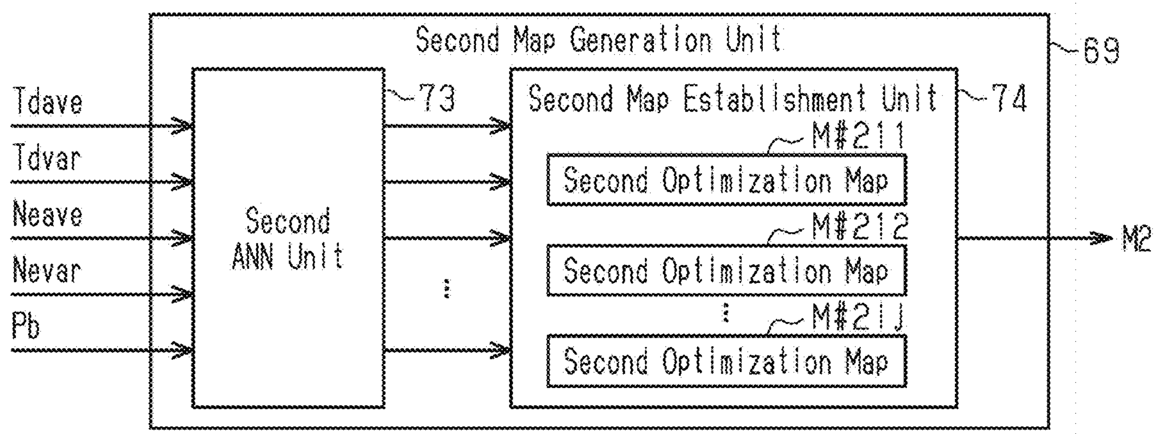
FIG. 8B is a functional block diagram showing an example of the second map generation unit.

As shown in FIG. 8A, the first map generation unit 67 includes various functional units that function when programs are executed. That is, the first map generation unit 67 includes a first ANN unit 71 and a first map establishment unit 72. As shown in FIG. 8B, the second map generation unit 69 includes various functional units that function when programs are executed. That is, the second map generation unit 69 includes a second ANN unit 73 and a second map establishment unit 74. The first map generation unit 67 and the second map generation unit 69 have the same basic configuration except for the condition for establishing an artificial neural network (ANN). Thus, the first map generation unit 67 will be described in detail, and the second map generation unit 69 will not be described in detail.

As shown in FIG. 9A, the first ANN unit 71 and the second ANN unit 73 are established using the result of preliminary simulations executed prior to being implemented in the hybrid ECU 31. The preliminary simulations are executed by inputting, to a simulation device 75, several hundreds of simulation patterns #111 to #1*ij* (i and j are integers greater than or equal to 1) in which various types of conditions in addition to various constraint conditions are set. The constraint conditions are related to, for example, the minimum engine torque of the engine 11 and the maximum motor torque of the M/G 12. The simulation patterns #111 to #1*ij* include torque patterns Tdrv #1 to Tdrv #i of the requested torque Tdrv in the set period Tk, suppliable power amounts Pb #1 to Pb #j in the set period Tk, and the maximum value of a motor power Pm. The simulation device 75 executes simulations for the simulation patterns #111 to #1*ij* using a dynamic programming method for a vehicle type equipped with the hybrid ECU 31. The simulation device 75 obtains, for each of the simulation patterns #111 to #1*ij*, an optimization map where the fuel consumption amount is the minimum. In the optimization map, the motor torque Tm is defined for each position corresponding to the requested torque Tdrv and the engine rotation speed Ne.

As shown in FIG. 9B, the simulation device 75 performs simulations in relation to the first ANN unit 71 (first neural network unit) without taking into account the battery temperature TmpB on condition that the maximum value of the motor power Pm is a first maximum power Pmt and the fuel consumption amount is the minimum. By performing such simulations, the simulation device 75 generates first optimization maps M #111 to M #1*ij* for the simulation patterns #111 to #1*ij*, respectively. The motor torque Tm defined for the first optimization maps M #111 to M #1*ij* is less than or equal to the first maximum torque Tm1.

As shown in FIG. 9C, when the first optimization maps M #111 to M #1*ij* are obtained, the characteristic amounts of the simulation patterns #111 to #1*ij* (requested torque average value Tdave, requested torque dispersion value Tdvar, engine rotation speed average value Neave, engine rotation speed dispersion value Nevar, and suppliable power amount) are set as inputs and the first optimization maps M #111 to M #1*ij* are set as outputs so that the first ANN unit 71 learns.

Figure 10:
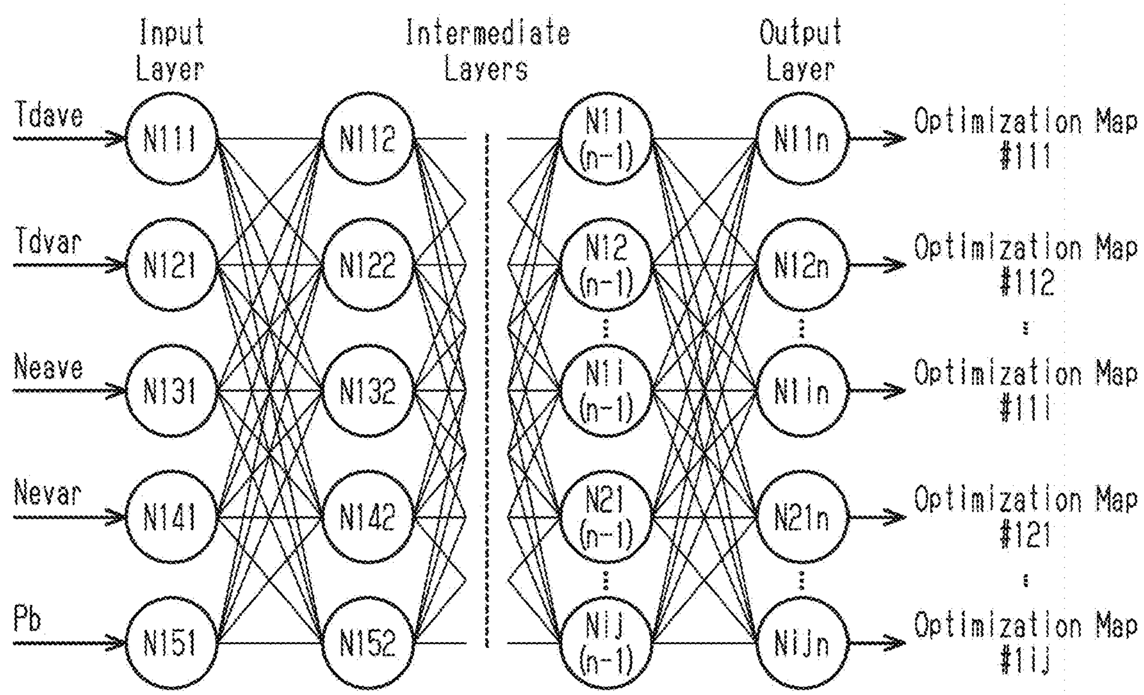
FIG. 10 is a diagram schematically showing an example of the configuration of the first neural network unit.

As shown in FIG. 10, in the first ANN unit 71 subsequent to learning, the nodes of an input layer each includes an activation function in which the characteristic amount in the set period Tk is a variable. The nodes of intermediate layers and the nodes of an output layer each include activation functions in which multiple calculation values in the nodes of the preceding layer and the values of multiple weights set for connection edges are variables. The nodes of the output layer correspond to the first optimization maps M #111 to M #1*ij*, respectively. Through the learning, the activation functions of the nodes and the weights of the connection edges are set such that when the characteristic amount in each of the simulation patterns #111 to #1*ij* is input to the first ANN unit 71, the corresponding one of the first optimization maps M #111 to M #1*ij* is output.

As shown in FIG. 8A, the first map establishment unit 72 holds the first optimization maps M #111 to M #1*ij*, which have been generated by the simulation device 75. Using multiple output values of the first ANN unit 71, the first map establishment unit 72 establishes the first map M1 by interpolating and extrapolating the first optimization maps M #111 to M #1*ij* in which the motor power Pm is permitted to be increased to the first maximum power Pm1. The first map M1 is used to drive the M/G 12 with a motor power Pm less than or equal to the first maximum power Pm1, that is, a motor torque Tm less than or equal to the first maximum torque Tm1.

As shown in FIG. 8B, for the second ANN unit 73 (second neural network unit) of the second map generation unit 69, the simulation device 75 executes simulations in the simulation patterns #111 to #1*ij* on condition that the maximum value of the motor power Pm is a second maximum power Pm2, which is smaller than the first maximum power Pm1, in addition to a fuel-related condition. The simulation device 75 obtains second optimization maps M #211 to #2*ij* for the simulation patterns #111 to #1*ij*, respectively. In this simulation, for example, a condition related to a temperature rise value of the battery temperature TmpB may be set. Such a condition includes, for example, a condition in which the temperature rise value is less than or equal to the difference between the switch temperature TmpB1 and the limit start temperature TmpB2 and a condition in which the temperature rise value is less than or equal to 30° C. Setting such a condition further ensures that an excessive rise in the battery temperature TmpB is curbed.

The activation functions of the nodes and the weights of the connection edges are set such that when the characteristic amount in each of the simulation patterns #111 to #1*ij* is input to the second ANN unit 73, the corresponding one of the second optimization maps M #211 to #2*ij* is output. For simulation patterns in which the torque pattern and the suppliable power amount are the same, the simulation device 75 may configure the first optimization map and the second optimization map such that the assist amount (workload) by the M/G 12 is the same. The motor torque Tm in the second optimization maps M #211 to #2*ij* obtained at the second maximum power Pm2 Pm1) is less than or equal to the second maximum torque Tm2, which is smaller than the first maximum torque Tm1. In the second optimization maps M #211 to #2*ij*, the fuel consumption amount is the minimum on condition that the second optimization maps M #211 to #2*ij* have a smaller maximum value of the motor power Pm than the first optimization maps M #111 to M #1*ij*. Thus, since the second optimization maps M #211 to #2*ij* have a smaller degree of freedom in the output of the M/G 12 than the first optimization maps M #111 to M #1*ij*, the second optimization maps M #211 to #2*ij* have a higher assist frequency than the first optimization maps M #111 to M #1*ij*.

The second map establishment unit 74 holds the second optimization maps M #211 to #2*ij*, which have been generated by the simulation device 75. Using multiple output values of the second ANN unit 73, the second map establishment unit 74 establishes the second map M2 by interpolating or extrapolating the second optimization maps M #211 to #2*ij* that have been obtained from the simulation in which the motor power Pm is limited to the second maximum power Pm2. The second map M2 is used to drive the M/G 12 with a motor power Pm less than or equal to the second maximum torque Tm2 (smaller than the first maximum power Pm1), that is, a motor torque Tm less than or equal to the second maximum torque Tm2 (smaller than the first maximum torque Tm1). The second map M2 has a higher frequency of driving the M/G 12 than the first map M1.

The operation of the hybrid ECU 31 with the above-described configuration will now be described with reference to FIG. 11. The description includes examples where the vehicle 10 is traveling with the torque pattern in a certain set period Tk set to the first control mode, the second control mode, and the limit mode.

An assist amount output by the M/G 12 in a unit time is proportional to the amount of power supplied from the battery 20 to the M/G 12 in the unit time, that is, proportional to the value of current flowing through the battery 20. Further, the heat generation amount of the battery 20 is proportional to the square of the value of current flowing through the battery 20. Thus, for example, even if the same amount of power is supplied from the battery 20 to the M/G 12 in the set period Tk, the heat generation amount of the M/G 12 in the set period Tk becomes larger as the proportion occupied by a power supply period in the set period Tk becomes smaller, that is, as the dispersion value of the motor power Pm in the set period Tk becomes larger.

Figure 11A:
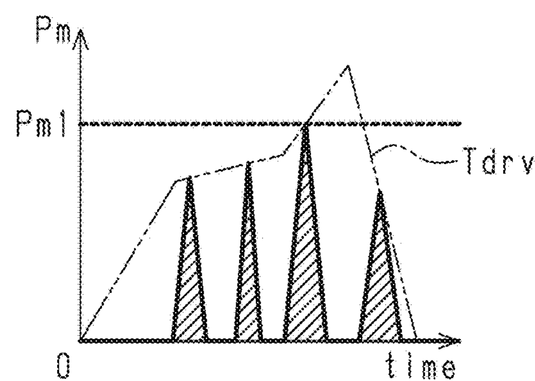
FIG. 11A is a graph showing an example of the relationship between the requested torque pattern and the motor power in the first control mode.

Referring to FIG. 11A, the first control mode assigns top priority to improving fuel economy. The first control mode is selected when the battery temperature TmpB belongs to the first region A1, which is a low-temperature region (TmpB<TmpB1). In the first control mode, the hybrid ECU 31 controls the motor torque Tm using the first map M1, in which the motor power Pm is permitted to be increased to the first maximum power Pm1 and the assist frequency is low. Thus, the motor power Pm becomes intensively high during a period when a condition in which the combustion efficiency of the engine 11 is low. That is, in the first control mode, while the heat generation amount of the battery 20 is large due to a large current flowing through the battery 20 during assisting, the assist of the engine 11 by the M/G 12 is executed most efficiently.

Figure 11B:
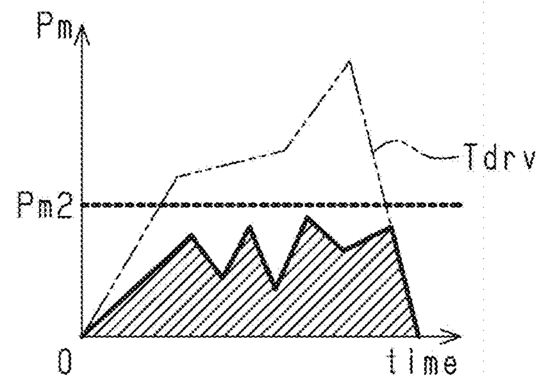
FIG. 11B is a graph showing an example of the relationship between the requested torque pattern and the motor power in the second control mode.

Referring to FIG. 11B, the second control mode improves fuel economy while curbing a rise in the battery temperature TmpB. The second control mode is selected when the battery temperature TmpB belongs to the second region A2, which is a medium-temperature region (TmpB1<TmpB<TmpB2). In the second control mode, the hybrid ECU 31 controls the motor torque Tm using the second map M2, in which the motor power Pm is limited to the second maximum power Pm2 (<Pm1) and the assist frequency is high. Accordingly, the second control mode continuously assists the engine 11 with a motor power Pm less than or equal to the second maximum power Pm2 for a longer period than the first control mode, and the second control mode assists the engine 11 by an amount corresponding to the workload that is substantially the same as the workload in the first control mode shown in FIG. 11A. The second control mode thus sets the workload of the M/G 12 to be approximately the same as the workload in the first control mode through the continuous assist of the engine 11 while curbing a rise in the battery temperature TmpB because of a smaller current flowing through the battery 20 during assisting than in the first control mode.

Figure 11C:
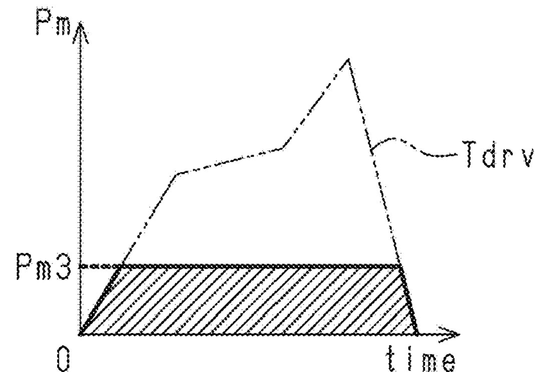
FIG. 11C is a graph showing an example of the relationship between the requested torque pattern and the motor power in the limit mode.

Referring to FIG. 11C, the limit mode assists the engine 11 by assigning top priority to curbing a rise in the battery temperature TmpB. The limit mode is selected when the battery temperature TmpB belongs to the limit region A3, which is a high-temperature region (TmpB2<TmpB). In the limit mode, when the requested torque Tdrv is less than or equal to the limit torque Tm3 corresponding to the battery temperature TmpB, a motor power Pm in which the motor torque Tm of the M/G 12 is the requested torque Tdrv is set. In contrast, when the requested torque Tdrv exceeds the limit torque Tm3 corresponding to the battery temperature TmpB, a motor power Pm3 in which the motor torque Tm of the M/G 12 is the limit torque Tm3 is set. The limit mode curbs a rise in the battery temperature TmpB more efficiently than the second control mode while continuously assisting the engine 11 by limiting the motor torque Tm to the limit torque Tm3.

The operation and advantages of the present embodiment will now be described.

(1) When the battery temperature TmpB is greater than or equal to the switch temperature TmpB1 and less than the limit start temperature TmpB2, the hybrid ECU 31 controls the motor torque Tm in the second control mode, which has a smaller maximum value of the motor torque Tm and a higher assist frequency than the first control mode. In the first control mode, the M/G 12 is driven using the first map M1, which is based on the result of a simulation where the motor power Pm is permitted to be increased to the first maximum power Pm1. In the second control mode, the M/G 12 is driven using the second map M2, which is based on the result of a simulation where the motor power Pm is limited to be less than or equal to the second maximum power Pm2 PM1). By controlling the motor torque Tm using the map based on the result of such a simulation, in the second control mode, the heat generation amount in the battery 20 is smaller than that in the first control mode, and the time of assisting the engine 11 with the M/G 12 is longer than in the first control mode. That is, when the battery temperature TmpB is in the first region A1, the hybrid ECU 31 controls the motor torque Tm using the first control mode of prioritizing fuel economy. When the battery temperature TmpB is in the second region A2, the hybrid ECU 31 controls the motor torque Tm using the second control mode, in which curbing a rise in the battery temperature TmpB and fuel economy are well-balanced. This allows the battery temperature TmpB to be easily maintained at a temperature less than the limit start temperature TmpB2 (i.e., maintained to be controllable to the motor torque Tm corresponding to the present travel state) while assisting the engine 11 with the motor. As a result, fuel economy is improved while an excessive rise in the battery temperature TmpB is curbed.

(2) Since an excessive rise in the battery temperature TmpB is curbed, the battery 20 has an extended life.

(3) The battery temperature TmpB remains less than the limit start temperature TmpB2 for an increased period of time. This reduces the frequency of a charge current of the battery 20 being limited due to the battery temperature TmpB. As a result, the charging efficiency with regeneration is increased so that fuel economy improves consequently.

(4) When the battery temperature TmpB is greater than or equal to the limit start temperature TmpB2, the torque control unit 63 limits the motor torque Tm to the limit torque Tm3. Such a configuration limits the motor torque Tm so as to assist the engine 11 while prioritizing the reduction in the battery temperature TmpB when the battery temperature TmpB exceeds the limit start temperature TmpB2. This consequently improves fuel economy while further ensuring that an excessive rise in the battery temperature TmpB is curbed.

(5) The first map generation unit 67 establishes the first map M1, which is an optimization map based on a characteristic amount in the set period Tk immediately before being updated, by the first map establishment unit 72 interpolating or extrapolating the first optimization maps M #111 to M #1*ij* using the output value of the first ANN unit 71. This allows the first map generation unit 67 to generate the first map M1, which is an optimal map corresponding to the characteristic amount in the set period Tk immediately before being updated. That is, the motor torque Tm is controlled in the next set period using the first map M1 suitable for a travel state in the recent set period. This effectively improves fuel economy in a state in which the battery temperature TmpB is less than the switch temperature TmpB1. In addition, the first map generation unit 67 generates an optimization map corresponding to each of vast characteristic amount patterns from approximately several hundreds of first optimization maps M #111 to M #1*ij*, which have been obtained using the result of preliminary simulations. Thus, the first map generation unit 67 simply has to hold these approximately several hundreds of first optimization maps M #111 to M #1*ij* and does not need to hold the optimization maps corresponding to the vast characteristic amount patterns. This reduces the capacity necessary for the first map generation unit 67 while enabling the generation of optimization maps for various patterns. The second map generation unit 69 provides such an advantage in the same manner.

The present embodiment may be modified as follows. The present embodiment and the following modifications can be combined as long as the combined modifications remain technically consistent with each other.

The hybrid ECU 31 is configured to acquire the motor temperature TmpM and the inverter temperature Tmp1 in addition to the battery temperature TmpB. In such a configuration, the hybrid ECU 31 may control the motor torque Tm using the second map M2 when the motor temperature TmpM exceeds a reasonable motor temperature or when the inverter temperature Tmp1 exceeds a reasonable inverter temperature. In this case, in the process of step S101 in the flowchart shown in FIG. 5, determination is also made for the motor temperature TmpM and the inverter temperature Tmp1 in addition to the battery temperature TmpB. This improves fuel economy while curbing excessive rises in the temperatures of the M/G 12 and the inverter 21 as well as an excessive rise in the battery temperature TmpB.

The map update unit 62 may update the first map M1 by, for example, selecting an appropriate map from the first optimization maps M #111 to M #1*ij* using the analysis result of the data analysis unit 61. Additionally, the map update unit 62 may update only the first map M1.

The map update unit 62 may update the second map M2 by, for example, selecting an appropriate map from the second optimization maps M #211 to #2*ij* using the analysis result of the data analysis unit 61. Additionally, the map update unit 62 may update only the second map M2.

In the hybrid ECU 31, the assist of the engine 11 by the M/G 12 may stop when the battery temperature TmpB is greater than or equal to the limit start temperature TmpB2.

The hybrid ECU 31 simply needs to switch between the first map M1 and the second map M2 with reference to the switch temperature TmpB1. Thus, the hybrid ECU 31 may hold one or more of the first map M1 and the second map M2.

The invention claimed is:

1. A motor control device configured to control a motor, the motor being configured to be supplied with power from a battery and assist an engine, the motor control device comprising:

an acquisition unit configured to acquire a battery temperature, a requested torque, and an engine rotation speed, the battery temperature being a temperature of the battery, the requested torque being torque requested from a driver, the engine rotation speed being a rotation speed of the engine; and a torque control unit configured to control a motor torque by selectively using one of a first map and a second map, the motor torque being output by the motor, the motor torque being defined in correspondence with the requested torque and the engine rotation speed in each of the first map and the second map, wherein the torque control unit is configured to:

control the motor torque using the first map when the battery temperature is less than a switch temperature, the switch temperature being lower than a limit start temperature at which the motor torque is limited; and control the motor torque using the second map when the battery temperature is greater than or equal to the switch temperature and less than the limit start temperature, and each of the first map and the second map includes an assist region defined using the requested torque and the engine rotation speed, the assist region of the second map being larger than the assist region of the first map, a maximum torque defined in the assist region of the second map being smaller than a maximum torque defined in the assist region of the first map.

2. The motor control device according to claim 1, wherein the torque control unit is configured to control the motor torque to a limit torque when the battery temperature is greater than or equal to the limit start temperature, the limit torque becoming smaller than the maximum torque defined in the assist region of the second map as the battery temperature becomes higher.

3. The motor control device according to claim 1, wherein the acquisition unit is further configured to acquire a charge current flowing through the battery, a state of charge of the battery, and a vehicle speed, the vehicle speed being a speed of a vehicle, the motor control device comprises:

a map update unit including a first map generation unit configured to generate the first map every time a set period elapses; and a data analysis unit configured to, using the requested torque, the engine rotation speed, the vehicle speed, and the charge current acquired in a set period immediately before being updated and using the state of charge during updating, calculate a requested torque average value, a requested torque dispersion value, an engine rotation speed average value, and an engine rotation speed dispersion value in the set period immediately before being updated and calculate an amount of power suppliable to the motor in a set period immediately after being updated, the first map generation unit includes a first neural network unit configured to set, as an input, a result calculated by the data analysis unit, and a first map establishment unit that holds first optimization maps that respectively correspond to simulation patterns, each of the first optimization maps being obtained by executing a preliminary simulation using a corresponding one of the simulation patterns, and the first map establishment unit is configured to establish a new first map by interpolating the first optimization maps using output values of the first neural network unit.

4. The motor control device according to claim 3, wherein the map update unit includes a second map generation unit that generates the second map every time the set period elapses, the second map generation unit includes a second neural network unit configured to set, as an input, a result calculated by the data analysis unit, and a second map establishment unit that holds second optimization maps that respectively correspond to simulation patterns, each of the second optimization maps being obtained by executing a preliminary simulation using a corresponding one of the simulation patterns, and the second map establishment unit is configured to establish a new second map by interpolating the second optimization maps using output values of the second neural network unit.

* * * * *